L. BLAKESTAD & O. A. ANDERSON.
ROAD CULVERT.
APPLICATION FILED NOV. 27, 1908.
911,368.
Patented Feb. 2, 1909.
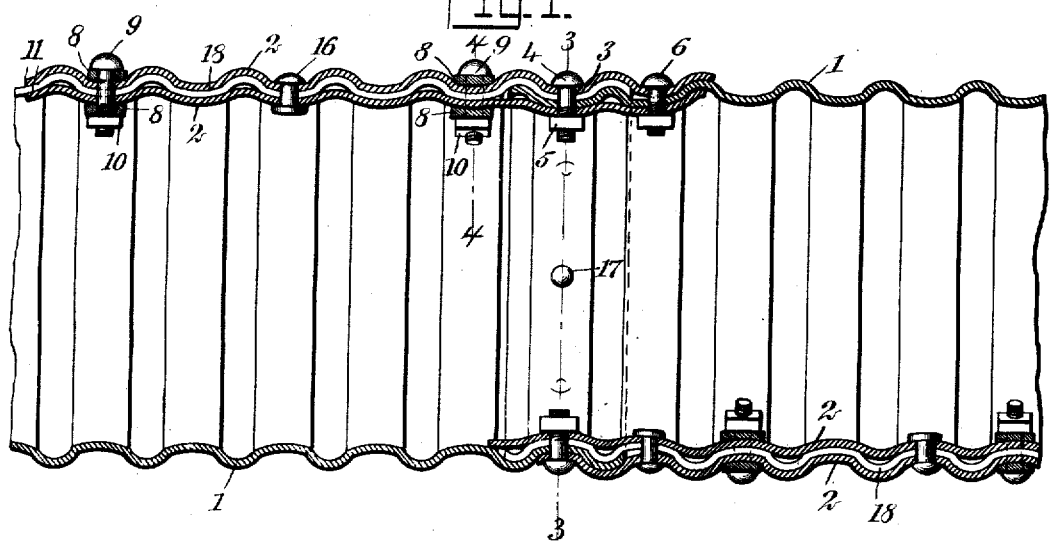
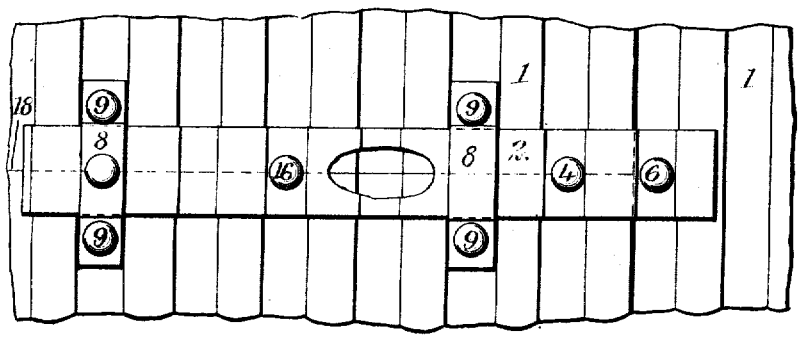
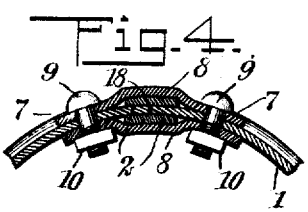
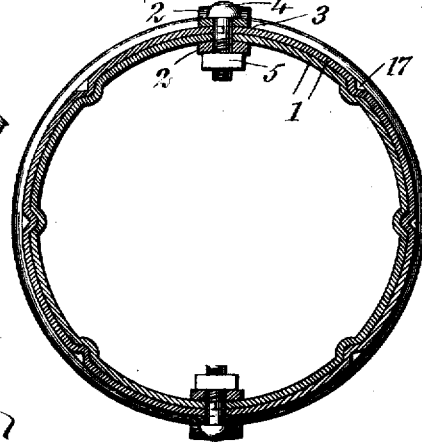
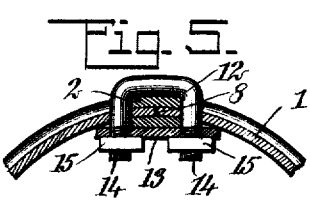
WITNESSES
INVENTORS
Louis Blakestad
Ole A. Anderson
BY
ATTORNEYS

UNITED STATES PATENT OFFICE.

LOUIS BLAKESTAD AND OLE A. ANDERSON, OF LYLE, MINNESOTA.

ROAD-CULVERT.

No. 911,368.

Specification of Letters Patent.

Patented Feb. 2, 1909.

Application filed November 27, 1908. Serial No. 464,773.

*To all whom it may concern:*

Be it known that we, LOUIS BLAKESTAD and OLE A. ANDERSON, citizens of the United States, and residents of Lyle, in the county of Mower and State of Minnesota, have invented a new and Improved Road-Culvert, of which the following is a full, clear, and exact description.

Our invention relates to road culverts and it has for its object to provide means for joining culvert members together, the means producing a much stronger culvert than other devices now in use. In our culvert the joints of the members are reinforced with cleats which are fastened together and are also fastened to the members.

Other objects of the invention will appear in the following complete description of the invention.

In this specification we will describe the preferred form of our invention, but it will be understood that we do not limit ourselves thereto, as we consider ourselves entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a longitudinal sectional view of the culvert; Fig. 2 is a plan view showing the cleats for fastening the culvert members together; Fig. 3 is a transverse sectional view on the line 3—3 of Fig. 1; Fig. 4 is a partial transverse sectional view on the line 4—4 of Fig. 1; and Fig. 5 is a partial transverse sectional view showing a modification of the means for holding the cleats in place.

By referring to the drawings, it will be seen that the culvert members 1 are corrugated, and that the terminal of one member is adapted to fit the terminal of a companion member, and that inasmuch as the corrugations are the same in both members, the terminals fit snugly. The members 1 are held together by cleats 2, which have transverse corrugations corresponding to the corrugations in the members 1. At opposite sides of the members 1 the cleats are disposed, one without and one within the culvert and longitudinally thereof, the cleats being disposed across the joint made by the two members. The cleats 2 are held in place in the following manner. An orifice 3 is made through the outer cleat 2, one of the members 1 near its terminal, and the inner cleat, and in this orifice 3 is disposed a bolt or rivet 4, which is driven home and firmly secured in place, either by riveting, or if it should be a bolt, by screwing a nut 5 thereon. At one side of this bolt or rivet 4, there is a similar bolt or rivet 6, the bolt or rivet 6 passing through the outer cleat 2, one of the members 1 and the inner cleat, and being bolted or secured in a manner similar to that in which the bolt or rivet 4 is secured. At the other side of the bolt or rivet 4 orifices 7 are made at either side of the cleats 2, the orifices extending through one of the members 1 and being in alinement with the orifices in transverse cleats 8, which are disposed within and without the member respectively. In these orifices 7 are disposed bolts 9, which are held in place by nuts 10. The terminals 11 of the cleats 2 are secured in a similar manner; or if desired, they may be secured by the means shown in the Fig. 5, where a clevis 12 is disposed around the outer cleat 2 and passes through orifices in the member 1 at either side of the cleat 2, and which has a transverse cleat 13 disposed over its inner terminals 14, nuts 15 screwing on the terminals of the clevis 12 to hold the inner and outer cleats 2 securely in place against the member 1. Additional rivets 16 may be disposed through the outer cleat 2, one of the members 1, and the inner cleat 2, and be secured thereto to afford further strength. In arranging these cleats, we preferably dispose one set of terminals a short distance over the lateral joint made by the two members 1, with their other terminals extending some distance along one of the members 1 from the lateral joint, and by using a plurality of sets of cleats 2, and arranging them with their longer end disposed alternately at either side of the lateral joint, we are able to secure the greatest strength.

It will be understood that while we show in the drawings only two sets of cleats, which are used to secure the members 1 together, any number of sets of cleats may be employed and that it will depend very much upon the purpose to which the culvert is to be put, how many pairs of cleats must be used to obtain the desired strength. Indentures 17 may be made in the members 1 where they overlap to assist in keeping them in alinement. Some of the cleats are disposed longitudinally of the hollow members and over and under longitudinal joints 18 in the hollow members, as well as transversely relatively to the lap made by the two members. It is deemed advisable to arrange the hollow members with the longitudinal joints 18 oppositely disposed to each other respectively.

Having thus described our invention, we claim as new and desire to secure by Letters Patent:

1. In a road culvert, two hollow members which lap, cleats which are disposed longitudinally of the members and within and without them respectively across the joint made by the two members, and members by which the cleats are secured to the hollow members.

2. In a road culvert, two hollow corrugated members which lap, the corrugations of one member fitting into the corrugations of the other member, cleats which are corrugated transversely, the cleats being disposed longitudinally of the members and within and without them respectively across the joint made by the two members, and members by means of which the cleats are secured to the hollow members.

3. In a road culvert, two hollow corrugated members which lap, the corrugations of one of the members fitting the corrugations of the other member, cleats which are corrugated, the cleats being disposed within and without the members respectively across the joint made by the two members, and transverse cleats by means of which the first named cleats are secured to the hollow member.

4. In a road culvert, two hollow members which lap, cleats which are disposed longitudinally of the members and within and without them respectively across the joint made by the two members, transverse cleats disposed within and without one of the hollow members, each of the transverse cleats being disposed over one of the first named cleats, and means by which the transverse cleats are bound together.

5. In a road culvert, two hollow corrugated members which lap, the corrugations of one of the members fitting the corrugations in the other member, cleats which are corrugated, the cleats being disposed longitudinally of the members and within and without them respectively over the joint made by the two corrugated members, transverse cleats disposed within and without one of the corrugated members, each of the transverse cleats being disposed over one of the first named cleats, and means by which the transverse cleats are bound together.

6. In a road culvert, two hollow members which lap, cleats which are disposed within and without the members respectively over the joint made by the two members, a transverse cleat disposed over one of the first named cleats, and a clevis which is disposed over an oppositely disposed cleat, the terminals of the clevis passing through orifices in one of the hollow members and in the transverse cleat and being secured to the latter.

7. In a road culvert, two hollow members, one of which has a longitudinal joint therein, the hollow members being arranged so that a terminal of one is disposed in a terminal of the other, cleats which are disposed within and without the hollow members respectively over the longitudinal joint in one of the hollow members and across the joint made by the two members, means for securing the cleats to one of the hollow members near the longitudinal joint, and means for securing the cleats to the other hollow member.

8. In a road culvert, two hollow corrugated members, each having a longitudinal joint therein, the hollow corrugated members being arranged so that a terminal of one is disposed in a terminal of the other with the longitudinal joints out of alinement, corrugated cleats which are disposed within and without the hollow corrugated members respectively over the longitudinal joints respectively and across the joint made by the two hollow corrugated members, transverse cleats which are disposed across the corrugated cleats respectively where they cover the longitudinal joints within and without the hollow corrugated members, means for securing the transverse cleats to the hollow corrugated members respectively near the longitudinal joints therein, and means for securing each set of cleats respectively to the hollow corrugated member which joins the hollow corrugated member having the longitudinal joint over which the cleats are disposed.

In testimony whereof we have signed our names to this specification in the presence of two subscribing witnesses.

LOUIS BLAKESTAD.
OLE A. ANDERSON.

Witnesses:
MATTIE E. HOLLISTER,
ARTHUR W. WRIGHT.